United States Patent [19]
Mitsui et al.

[11] Patent Number: 5,192,452
[45] Date of Patent: Mar. 9, 1993

[54] CATALYST FOR WATER TREATMENT

[75] Inventors: Kiichiro Mitsui, Akashi; Tooru Ishii, Himeji; Sadao Terui, Hyogo; Kunio Sano, Ako; Akira Inoue, Hirakata, all of Japan

[73] Assignee: Nippon Shokubai Kagaku Kogyo, Co., Ltd., Osaka, Japan

[21] Appl. No.: 782,787

[22] Filed: Oct. 24, 1991

Related U.S. Application Data

[60] Continuation of Ser. No. 540,140, Jun. 19, 1990, abandoned, which is a division of Ser. No. 378,990, Jul. 12, 1989, abandoned.

[30] Foreign Application Priority Data

Jul. 12, 1988 [JP] Japan ................... 63-171824
Sep. 29, 1988 [JP] Japan ................... 1-242380

[51] Int. Cl.$^5$ ............................................. C02F 1/78
[52] U.S. Cl. ................... 210/760; 210/763; 210/764; 210/916; 210/917; 422/28; 422/30
[58] Field of Search ............... 210/760, 763, 764, 691, 210/916, 917; 422/28, 29, 30

[56] References Cited

U.S. PATENT DOCUMENTS

| | | | |
|---|---|---|---|
| 4,007,118 | 2/1977 | Ciambrone | 210/760 |
| 4,008,159 | 2/1977 | Besik | 210/760 |
| 4,029,578 | 6/1977 | Turk | 210/760 |
| 4,040,982 | 8/1977 | Basila et al. | 210/760 |
| 4,751,005 | 6/1988 | Mitsui et al. | 210/760 |

FOREIGN PATENT DOCUMENTS

| | | | |
|---|---|---|---|
| 275620 | 7/1988 | European Pat. Off. | |
| 2432483 | 2/1980 | France | 210/760 |
| 56-100688 | 8/1981 | Japan | 210/760 |
| 500634 | 4/1982 | Japan | |
| 139991 | 8/1984 | Japan | |
| 97643 | 5/1987 | Japan | |
| 72396 | 4/1988 | Japan | |
| 126525 | 5/1988 | Japan | |
| 158189 | 7/1988 | Japan | |
| 960132 | 9/1982 | U.S.S.R. | 210/760 |
| 1321695 | 7/1987 | U.S.S.R. | 210/760 |

*Primary Examiner*—Stanley S. Silverman
*Assistant Examiner*—Neil M. McCarthy
*Attorney, Agent, or Firm*—Burns, Doane, Swecker & Mathis

[57] ABSTRACT

This invention relates to a catalyst for use in water treatment and to a method for the water treatment by the use of the catalyst. The catalyst comprises a first catalyst component e.g. the oxide of titanium, silicon, aluminum and zirconium, and a second catalyst component e.g. manganese, iron, cobalt, nickel, cerium, tungsten, copper, silver, gold, platinum, palladium, rhodium, ruthenium, and iridium or a sparingly water-soluble compound of the metal.

5 Claims, No Drawings

CATALYST FOR WATER TREATMENT

This application is a continuation of application Ser. No. 540,140, filed Jun. 19, 1990 which is a division of application Ser. No. 378,990 filed Jul. 12, 1989 now abandoned.

BACKGROUND OF THE INVENTION

1. Field of the Invention

This invention relates to a catalyst for use in water treatment and to a method for the water treatment by the use of the catalyst. More particularly, this invention relates to a water-treating catalyst to be used in the treatment of water with ozone for deodoring, sterilization and decoloring treatment, a water-treating catalyst to be used for the decomposition and removal of ozone remaining in the water resulting from the water treatment with ozone, and a method for the water treatment by the use of the catalyst mentioned above.

2. Description of the Prior Art

The treatment of ozonization is widely used for oxidative decomposition and removal of harmful components, odorous component, coloring components, etc. from water. It is specifically utilized in treating waste water or service water for the purpose of deodorization, sterilization, and decolorization. Particularly, in recent years, the treatment of ozonization has been gaining in significance in the light of the problem of pollution of water with trihalomethane, the problem of leakage of odorous pollutant in service water due to the degradation of quality of water entering the water supply system, and the necessity for high-degree treatment due to fortification of the regulation on disposal of waste water. When the treatment is performed solely with ozone, however, the speed of oxidation of the hostile components is slow and the efficiency of removal of the components is low. As a remedy for the imperfection of this treatment, a method for combining the treatment of ozonization and the treatment with ultraviolet light has been proposed (Japanese Patent Laid-Open SHO 63(1988)-72,396). Though this method enhances the efficiency of removal of hostile components, it suffers from the disadvantage that the speed of treatment is slow and the equipment for the treatment is complicate. A catalyst has been proposed (WO 81/02887) which is used in the treatment of ozonization for the purpose of enhancing the efficiency of removal of hostile component with ozone. It is not fully satisfactory, however, in terms of the speed of treatment and the durability.

The ozone dissolved in water is decomposed relatively quickly in the alkaline zone. In the neutral to acid zone, however, it is decomposed slowly and takes up much time for decomposition. The residual ozone which survives the decomposition poses a problem. Where the treatment of ozonization is followed by a treatment with chlorine, for example, there ensures a demerit that the residual ozone entails an increase in the amount of chlorine used for the treatment. Where the treatment of ozonization is followed by a treatment with activated carbon, there arises the problem that the residual ozone consumes the activated carbon in the form of oxidation. The prevention of these problems necessitates removal of the residual ozone. Few techniques have ever been developed for effecting this removal of the residual ozone. Among the methods resorting to use of a catalyst is counted a method which uses a filter material layer provided with a manganese dioxide catalyst surface (Japanese Patent Laid-Open SHO 59(1984)-139,991).

An object of this invention, therefore, is to provide a catalyst for use in water treatment which exhibits a highly satisfactory performance in such treatments for water as aimed at deodorization, sterilization, and decolorization, displays an activity of decomposing ozone, and retains stability of quality for a long time.

Another object of this invention is to provide a catalyst for use in water treatment which displays a high ozone-decomposing activity, retains stability of quality for a long time, and permits the residual dissolved ozone in water to be decomposed and removed in a wide pH range.

A further object of this invention is to provide a method for the treatment of water by the use of ozone such as for deodorization, sterilization, and decolorization.

Yet another object of this invention is to provide a method for the decomposition and removal of dissolved ozone remaining in water after the water treatment by the use of ozone.

SUMMARY OF THE INVENTION

The objects described above are accomplished by a catalyst for use in water treatment by the use of ozone, which catalyst comprises a first catalyst component formed of the oxide of at least one metal selected from the group consisting of titanium, silicon, aluminum, and zirconium and a second catalyst component formed of at least one metal selected from the group consisting of manganese, iron, cobalt, nickel, cerium, tungsten, copper, silver, gold, platinum, palladium, rhodium, ruthenium, and iridium or a sparingly water-soluble compound of the metal.

The objects are also accomplished by a method for water treatment, which comprises causing the water under treatment to contact a catalyst comprising a first catalyst component formed of the oxide of at least one metal selected from the group consisting of titanium, silicon, aluminum, and zirconium and a second catalyst component formed of at least one metal selected from the group consisting of manganese, iron, cobalt, nickel, cerium, tungsten, copper, silver, gold, platinum, palladium, rhodium, ruthenium, and iridium or a sparingly water-soluble compound of the metal.

EXPLANATION OF THE PREFERRED EMBODIMENT

The catalyst of the present invention is characterized by comprising, as a first catalyst component, the oxide of at least one metal selected from the group consisting of titanium, silicon, aluminum, and zirconium and, as a second catalyst component, at least one metal selected from the group consisting of manganese, iron, cobalt, nickel, cerium, tungsten, copper, silver, gold, platinum, palladium, rhodium, ruthenium, and iridium or a sparingly water-soluble compound of the metal.

After a study, we have found that, in the treatment of water by the use of ozone as for deodorization, sterilization, and decolorization, the first catalyst component or the second catalyst component used alone does not exhibit any sufficient activity, effect any sufficient decomposition of ozone, or retain any lasting stability of quality and the first catalyst component and the second catalyst component used jointly serve as a catalyst exhibiting an improved activity in the treatment and experiencing no appreciable deterioration by aging. The oxidation with ozone of the compounds responsible for odor and color and the viruses and fungi defiling the water under the treatment mentioned above proceeds efficiently on the catalyst of this invention. The use of the catalyst, therefore, improves the speed of treatment and the efficiency of use of ozone and enhances the efficiency of decomposition of the dissolved ozone. Further, since the catalyst of this invention displays an activity of decomposing ozone, proper disposition of layers of this catalyst fulfills the additional purpose of decomposing the residual dissolved ozone in water.

Properly, the ratio of the catalyst components in the catalyst of the present invention is such that the proportion of the first catalyst component falls in the range of 70 to 99.99% by weight, preferably 80 to 99.95% by weight, as oxide and the proportion of the second catalyst component in the range of 30 to 0.01% by weight, preferably 20 to 0.05 % by weight, as metal or oxide. Desirably, in the metals of which the second catalyst component is formed, at least one metal selected from the group consisting of manganese, iron, cobalt, nickel, cerium, tungsten, copper, and silver is used in an amount in the range of 30 to 0% by weight as compound (such as, for example, such a compound as oxide or sulfide which is insoluble or sparingly soluble in water) and/or at least one metal selected from the group consisting of gold, platinum, palladium, rhodium, ruthenium and iridium is used in an amount in the range of 10 to 0% by weight as metal (providing that the total amount of the two metals so selected is in the range of 30 to 0.01% by weight). The total amount of the first catalyst component and the second catalyst component is 100% by weight. If the amount of the second catalyst component is less than the lower limit of the range mentioned above, the activity of treatment displayed by the catalyst in the treatment of water with ozone as for deodorization, sterilization, and decolorization, and the activity in the decomposition of dissolved ozone is insufficient. If the amount of such precious metal as platinum, palladium, or rhodium exceeds the upper limit of the range mentioned above, the cost of raw materials is unduly high and the effect cannot be expected to be proportionately improved. When the amount of the first catalyst component is in the range mentioned above, the produced catalyst enjoys highly satisfactory moldability and can be formed easily in any desired shape and the catalyst enjoys ample lasting stability and displays a highly satisfactory activity. From the standpoint of catalytic activity, the first catalyst component and the second catalyst component prepared in the proportions satisfying the aforementioned range of composition are mutually dispersed thoroughly in each other.

The first catalyst component is desired to be the composite oxide of at least two elements selected from the group consisting of titanium, silicon, and zirconium. The composite oxide possesses a strong solid acidity and a high BET surface area and proves desirable from the viewpoint of catalyst activity, catalyst moldability, and stability of strength.

The catalyst to be used in this invention is desired to be produced in the form of pellets, or honeycombs and used as a stationary catalyst bed because this catalyst is easy to handle and lowers the resistance offered to the flow of the water under treatment. Particularly when the water under treatment contains solid substances, the catalyst is desired to be in the form of honeycombs because this catalyst can lower the possibility of entailing the phenomenon of clogging.

The honeycombs of catalyst are desired to be so shaped that the equivalent diameter of through holes is in the range of 2 to 20 mm, preferably 2.5 to 15 mm, the wall thickness of cell in the range of 0.1 to 3 mm, and the ratio of openings in the range of 50 to 90%. Preferably, the wall thickness of cell is in the range of 0.5 to 3 mm and the ratio of openings in the range of 50 to 80%. If the equivalent diameter of the through holes is less than 2 mm, the pressure less is unduly large and, particularly where the water under treatment contains a solid substances, the phenomenon of clogging tends to occur. When the equivalent diameter exceeds 20 mm, the catalytic activity is not sufficient, though the pressure loss is small and the phenomenon of clogging is inconspicuous. When the wall thickness of cell is less than 0.1 mm, there arises the disadvantage that the catalyst is deficient in mechanical strength, despite the advantage that the pressure loss is small and the weight is small light. When the wall thickness of cell exceeds 3 mm, the pressure loss is intolerably large in spite of sufficiency of mechanical strength. By the same token, the ratio of openings is required to be in the range of 50 to 90%. The cross-sectional shape of the through holes may be a rectangle, a hexagon, or a corrugated circle. The honeycombs of catalyst fulfilling the desirable conditions of shape described above possess sufficient mechanical strength and sufficient geometric surface area and, therefore, excel in durability and provides efficient treatment of given water with pressure loss and high flow speed. Even when the water under treatment happens to contain a solid substance, they retain high activity over a long period without inducing the phenomenon of clogging.

The catalyst of this invention may be produced by the following method, for example. Of course, this is not the only method that is available for this production. Specifically, this catalyst is obtained by thoroughly stirring the first catalyst component in a powdery form in an aqueous solution containing such active elements as transition metal and precious metal cited above as the raw materials for the second catalyst component, immediately molding the resultant mixture in a desired shape, drying the molded mixture at a temperature in the range of 50° to 120° C., and then calcining the dry molded mixture at a temperature in the range of 300° to 800° C., preferably 350° to 600° C., for a period in the range of 1 to 10 hours, preferably 2 to 6 hours. Otherwise, the catalyst may be obtained by calcining the aforementioned mixture thereby preparing a powdery catalyst composition and subsequently depositing this powder on a suitable carrier. Alternatively, the production of the catalyst is attained by molding, drying, and calcining the first catalyst component in a powdery form thereby preparing a catalyst carrier, causing an aqueous solution of metal salts of the second catalyst component to be deposited on the catalyst carrier by the technique of impregnation, and calcining the resultant composite.

Where the composite oxide of at least two elements selected from the group consisting of titanium, silicon, and zirconium is used as the first catalyst component, the composite oxide in a powdery form can be prepared as follows.

For example, the powder of a binary composite oxide of titanium and silicon (hereinafter referred to as "$TiO_2$—$SiO_2$") may be produced by any of the following methods.

(1) A method which comprises mixing titanium tetrachloride with silica sol, adding ammonia to the resultant mixture thereby inducing precipitation, and then calcining the washed dry precipitate at a temperature in the range of 300° to 650° C., preferably 350° to 600° C.

(2) A method which comprises adding an aqueous sodium silicate solution to titanium tetrachloride thereby inducing a reaction accompanied by precipitation, washing and drying the precipitate, and then calcining the washed dry precipitate at a temperature in the range of 300° to 650° C., preferably 350° to 600° C.

(3) A method which comprises adding ethyl silicate [$(C_2H_5O)_4Si$] to a water-alcohol solution of titanium tetrachloride thereby inducing a reaction of hydrolysis accompanied by precipitation, washing and drying the precipitate, and then calcining the washed dry precipitate at a temperature in the range of 300° to 650° C., preferably 350° to 600° C.

(4) A method which comprises adding ammonia to a water-alcohol solution of titanium oxychloride ($TiOCl_2$) and ethyl silicate thereby inducing precipitation, washing and drying the precipitate, and then calcining the washed dry precipitate at a temperature in the range of 300° to 650° C., preferably 350° to 600° C.

Among the methods cited above, the method of (1) proves particularly desirable. To be more specific, this method is carried out as follows. The aforementioned compounds as titanium source and silicon source are weighed out in amounts calculated to fix the molar ratio of $TiO_2$ to $SiO_2$ at a prescribed level and are kept in the state of an acid aqueous solution or the state of a sol in a concentration in the range of 1 to 100 g, preferably 10 to 80 g, as oxide of titanium and silicon per liter at a temperature in the range of 10° to 100° C. The solution or sol was agitated and aqua ammonia was added dropwise thereto as a neutralizing agent and they were further agitated for 10 minutes to three hours at a pH value in the range of 5 to 10 to induce occurrence of a coprecipitated compound consisting of titanium and silicon. The compound is separated by filtration, thoroughly washed, then dried at a temperature in the range of 80° to 140° C. for a period in the range of 1 to 10 hours, and calcined at a temperature in the range of 300° to 650° C., preferably 300° to 600° C., for a period in the range of 1 to 10 hours, preferably 2 to 8 hours, to obtain a $TiO_2$—$SiO_2$ powder.

As the starting materials, the titanium source can be selected from among such inorganic titanium compounds as titanium chlorides and titanium sulfates and such organic titanium compounds as titanium oxalate and tetraisopropyl titanate and the silicon source from among such inorganic silicon compounds as colloidal silica, water glass, and silicon tetrachloride and such organic silicon compounds as tetraethyl silicate. Some of these raw materials contain impurities or foreign substances in a minute amount. These extraneous substances pose no problem unless they have an appreciable effect on the characteristic properties of $TiO_2$—$SiO_2$.

The powder of a binary composite oxide of titanium and zirconium (hereinafter referred to as "$TiO_2$—$ZrO_2$") can be similarly prepared.

The $TiO_2$—$ZrO_2$ powder may be produced by either of the following methods.

(1) A method which comprises mixing titanium chloride with zirconium oxychloride, adding ammonia to the resultant mixture thereby inducing precipitation, washing an drying the precipitate, and then calcining the washed dry precipitate at a temperature in the range of 300° to 650° C., preferably 350° to 600° C.

(2) A method which comprises adding zirconium nitrate to titanium tetrachloride, thermally hydrolyzing the resultant mixture thereby inducing precipitation, and then calcining the washed dry precipitate at a temperature in the range of 300° to 650° C., preferably 350° to 600° C.

The compounds which are usable as the starting material for the second catalyst component which is used in conjunction with the first catalyst component include oxides, hydroxides, inorganic acid salts, and organic acid salts. The raw material may be selected suitably from among ammonium salts, oxalates, nitrates, sulfates, and halogenides, for example.

The catalyst of this invention adsorbs thereon the compounds responsible for the odor and color and the viruses and fungi and efficiently promotes the oxidation of ozone thereon. Since the speed of the reaction of treatment increases and, at the same time, the speed of the decomposition of ozone increases in proportion as the temperature rises, the temperature of treatment is desired to be in the range of 0° to 60° C., preferably 5 to 45° C. Though the amount of water for the treatment is variable with the ratio of treatment and the conditions of treatment, it is generally in the range of 1 to 1,000 liters/hr, preferably 5 to 600 liters/hr, as flow volume per liter of the catalyst. The condition of pressure for the treatment is but not limited to normal pressures. The catalyst fulfills its function sufficiently under normal pressure. For the supply of ozone to the catalyst bed for treatment, a method which comprises dissolving ozone in advance in the water under treatment and supplying the resultant solution to the catalyst bed and a method which comprises advancing an ozone-containing gas to the catalyst bed jointly with the water under treatment are available, for example.

The catalyst to be used in the present invention possesses an ability to decompose ozone to oxygen. Suitably, the treating temperature is in the range of 0° to 90° C. When the treating temperature is increased, though the speed of decomposition of ozone itself in the absence of a catalyst is proportionally increased, the merit such as of saving the utility due to the performance of the reaction at a lower temperature in the presence of a catalyst diminishes. Preferably, therefore, the treating temperature is desired to be in the range of 0° to 60° C. The amount of the water for the treatment is used in the range of 1 to 1,000 liters/hr, preferably 5 to 600 liters/hr, as flow volume per liter of the catalyst, though it is variable with the ratio of treatment and the conditions of treatment. The condition of pressure is not specifically defined. The catalyst fulfills its function sufficiently under normal pressures. Suitably, the dissolved ozone concentration in the water under treatment is in the range from the saturated concentration of dissolved ozone to 0.1 mg/liter. The merit of using the catalyst is small when the ozone concentration is less than 0.1 mg/liter.

Now, the present invention will be described more specifically below with reference to working examples and comparative experiments. This invention is not limited to these examples.

EXAMPLE 1

A binary composite oxide of titanium and zirconium was prepared by a procedure described below. An aqueous sulfuric acid solution of titanyl sulfate of the following composition was used as a titanium source.

| | |
|---|---|
| TiOSO$_4$ (as TiO$_2$) | 250 g/liter |
| Total H$_2$SO$_4$ | 1,100 g/liter |

A solution of 1.93 kg of zirconium oxychloride [ZrOCl$_2$.8H$_2$O] in 50 liters of water was thoroughly mixed with 7.7 liters of the aqueous sulfuric acid solution of titanyl sulfate of the composition mentioned above. The mixture was kept at a temperature of about 30° C. in a stirred state and aqua ammonia was gradually added thereto dropwise until the pH value reached 7 and a coprecipitated gel was formed. The reaction mixture thus formed was then left standing for 15 hours. The gel was separated by filtration, washed with water, dried at 200° C. for 10 hours, and then calcined under an atmosphere of air at 500° C. for five hours. The powder consequently obtained had a composition of TiO$_2$ ZrO$_2$=4:1 (molar ratio) and a BET surface area of 150 m$^2$/g.

A mixture consisting of 850 ml of water, 1.5 kg of the powder mentioned above, and 75 g of starch was thoroughly kneaded. The resultant blend was extrusion molded in the form of honeycombs having a bore diameter (equivalent diameter of through hole) of 3 mm, a wall thickness of 0.6 mm, and a ratio of openings of 69%, dried at 120° C. for six hours, and then calcined at 450° C. for six hours.

The honeycombs thus obtained were impregnated with an aqueous cerium (%) nitrate, dried at 120° C. for six hours, and calcined at 400° C. for three hours, to obtain a catalyst containing 5% by weight of CeO$_2$.

EXAMPLE 2

A powdery binary composite oxide of titanium and silicon possessing a composition of TiO$_2$:SiO$_2$=4:1 (molar ratio) and a BET surface area of 170 m$^2$/g was obtained by following the procedure of Example 1, except that colloidal silica was used in place of zirconium oxychloride.

By further following the procedure of Example 1, this powder was molded in the form of pellets 5 mm in diameter and treated with an aqueous rhodium chloride solution to produce a catalyst containing 0.4% by weight of rhodium.

EXAMPLE 3

A mixture of 5 kg of commercially available titanium oxide powder with a solution of 0.69 kg of manganese nitrate [Mn(NO$_3$)$_2$.6H$_2$O] in 2.1 liters of water was extrusion molded in the form of honeycombs having a bore diameter (equivalent diameter of through hole) of 6 mm, a wall thickness of 1.08 mm, and a ratio of openings of 72% by following the procedure of Example 1. The produced catalyst was found to be composed of 4% by weight of MnO$_2$ and 96% by weight of TiO$_2$.

EXAMPLE 4

A catalyst of a composition of 1% by weight of Rh and 99% by weight of Al$_2$O$_3$ was obtained by impregnating commercially available γ-alumina carrier beads 4 mm in diameter with an aqueous rhodium chloride solution, and drying and calcining the wet carrier beads.

EXAMPLES 5 TO 13

Catalysts of a varying composition and a varying shape indicated in Table 1 were produced by following the procedures of Examples 1 to 3.

In the table, the binary composite oxide of titanium and silicon is indicated by the symbol TS and that of titanium and zirconium by the symbol TZ. The molar ratio of two elements of each binary composite oxide is indicated by the expression [mol % of titanium:mol % of other element].

TABLE 1

| | | | Dimensions | | | |
|---|---|---|---|---|---|---|
| Catalyst | Catalyst composition | Shape | Equivalent diameter (mm) | Wall thickness of Cell (mm) | Ratio of openings (%) | Diameter of pellets (mm) |
| Example 5 | Fe$_2$O$_3$ (25 wt %) - TZ[80:20] (75 wt %) | Honeycomb | 8 | 1.2 | 76 | — |
| Example 6 | CuO (10 wt %) - TZ[80:20] (90 wt %) | Honeycomb | 8 | 1.2 | 76 | — |
| Example 7 | AgO (10 wt %) - TS[90:10] (90 wt %) | Honeycomb | 8 | 1.2 | 76 | — |
| Example 8 | NiO (10 wt %) - TiO$_2$ (90 wt %) | Honeycomb | 15 | | 78 | — |
| Example 9 | Pt (0.2 wt %) - TZ[70:30] (99.8 wt %) | Honeycomb | 3 | 0.61 | 69 | — |
| Example 10 | Ru (1 wt %) - TS[80:20] (99 wt %) | Honeycomb | 7.5 | 2.8 | 53 | — |
| Example 11 | Ir (1 wt %) - SiO$_2$ (99 wt %) | Honeycomb | 4 | 0.36 | 84 | — |
| Example 12 | Au (1 wt %) - TiO$_2$ (99 wt %) | Pellet | — | — | — | 5 |
| Example 13 | Pd (1 wt %) - TS[80:20] (99 wt %) | Honeycomb | 8 | 1.2 | 76 | — |

EXAMPLE 14

A 200-ml sample of each of the catalysts of Examples 1 to 13 was packed in a test tube. To the catalyst bed in the tube, the water from secondary treatment of sewage was fed at a flow volume of 4 liters/hour and an ozone-containing gas at a flow volume of 0.5 g/hour to induce a reaction at normal room temperature. In a comparative experiment, the same treatment was performed with a reaction tube not packed with any catalyst. The water was tested for chromaticity, odor, number of groups of colon bacilli, and ozone content at the inlet and outlet of the test tube. The intensity of odor was evaluated by the six-step odor intensity display method. The results of the treatment were as shown in Table 2.

TABLE 2

| Reactor outlet | Chromaticity | Intensity of odor | Number of groups of colon bacilli | Ozone concentration |
|---|---|---|---|---|
| Example 1 catalyst | 5 not more than | 0 | not detected | 0 mg/l |
| Example 2 catalyst | 5 not more than | 0 | not detected | 0 mg/l |
| Example 3 catalyst | 5 not more than | 0 | not detected | 0 mg/l |
| Example 4 catalyst | 5 not more than | 0 | not detected | 0 mg/l |
| Example 5 catalyst | 5 not more than | 0 | not detected | 0 mg/l |

TABLE 2-continued

| Reactor outlet | Chromaticity | In-tensity of odor | Number of groups of colon bacilli | Ozone concentration |
| --- | --- | --- | --- | --- |
| Example 6 catalyst | 5 not more than | 0 | not detected | 0 mg/l |
| Example 7 catalyst | 5 not more than | 0 | not detected | 0 mg/l |
| Example 8 catalyst | 8 | 0 | 20 pieces/ml | 0 mg/l |
| Example 9 catalyst | 5 not more than | 0 | not detected | 0 mg/l |
| Example 10 catalyst | 5 not more than | 0 | not detected | 0 mg/l |
| Example 11 catalyst | 5 not more than | 0 | not detected | 0 mg/l |
| Example 12 catalyst | 5 not more than | 0 | not detected | 0 mg/l |
| Example 13 catalyst | 5 not more than | 0 | not detected | 0 mg/l |
| Comparative experiment 1 (no catalyst) | 20 | 1 | 100 pieces/ml | 2 mg/l |
| Reactor inlet (aqueous materials to be treated) | 60 | 3 | 2000 pieces/ml | — |

EXAMPLE 15

The reaction of Example 5 was continued under the conditions of Example 5 for 1,000 hours. At the end of this continued treatment, the catalyst was removed from the test tube and subjected to compression strength test, to find the strength ratio of the catalyst before and after the treatment. The results were as shown in Table 3.

TABLE 3

| Catalyst | Ratio of strength (after/before reaction) |
| --- | --- |
| Example 1 catalyst | 0.99 |
| Example 2 catalyst | 0.99 |
| Example 3 catalyst | 0.98 |
| Example 4 catalyst | 0.91 |
| Example 5 catalyst | 0.99 |
| Example 6 catalyst | 0.99 |
| Example 7 catalyst | 0.99 |
| Example 8 catalyst | 0.97 |
| Example 9 catalyst | 0.99 |
| Example 10 catalyst | 0.99 |
| Example 11 catalyst | 0.94 |
| Example 12 catalyst | 0.98 |
| Example 13 catalyst | 0.99 |

EXAMPLE 16

A 300-ml sample of each of the catalysts of Examples 1 and 3 was packed in a test tube. Water containing a suspended substance (SS) in a concentration of 500 mg/liter was fed at a flow volume of 10 liters/hour and an ozone-containing gas in a flow volume of 0.7 g/hour to induce a reaction at normal room temperature. Even after 1,000 hours continued reaction, the catalyst showed no sign of clogging.

EXAMPLE 17

A binary composite oxide of titanium and zirconium was prepared by a procedure described below. An aqueous sulfuric acid solution of titanyl sulfate having the following composition was used as a titanium source.

| | |
| --- | --- |
| $TiOSO_4$ (as $TiO_2$) | 250 g/liter |
| Total $H_2SO_4$ | 1,100 g/liter |

A solution of 2.77 kg of zirconium oxychloride [$ZrOCl_2 \cdot 8H_2O$] in 59 liters of water was thoroughly mixed with 6.4 liters of the aqueous sulfuric acid solution of titanyl sulfate mentioned above. The resultant mixture was kept at a temperature of about 30° C. in a thoroughly stirred state and aqua ammonia was gradually added thereto dropwise until the pH value reached 7 and a coprecipitated gel was forced. The resultant blend was left standing at reset for 15 hours. Then, the gel was separated by filtration, washed with water, dried at 200° C. for 10 hours, and then calcined in an atmosphere of air at 500° C. for five hours. The powder consequently obtained had a composition of $TiO_2:ZrO_2=7:3$ (molar ratio) and a BET surface area of 120 $m^2/g$.

A mixture consisting of 850 ml of water, 1.5 kg of the powder mentioned above, and 75 g of starch was thorough kneaded in a kneader. The blend was extrusion molded in the form of honeycomb possessing a bore diameter (equivalent diameter of through hole) of 4 mm, a wall thickness of 1 mm, and a ratio of openings of 64%. The honeycombs were dried at 120° C. for six hours and then calcined at 450° C. for six hours.

The honeycombs were impregnated with an aqueous palladium chloride solution, dried at 120° C. for six hours, and calcined at 400° C. for three hours, to produce a catalyst containing 0.5% by weight of Pd.

EXAMPLE 18

A mixture of 1.8 kg of a commercially available titanium oxide powder with a solution of 0.5 kg of cerium (III) nitrate [$Ce(NO_3)_3 \cdot 6H_2O$] in 0.9 liter of water was extrusion molded in the form of pellets 5 mm in diameter by following the procedure of Example 17. The catalyst consequently formed has a composition of 10% by weight of $CeO_2$ and 90% by weight of $TiO_2$.

EXAMPLE 19

A powdery binary composite oxide of titanium and silicon possessing a composition of $TiO_2:SiO_2=9:1$ (molar ratio) and a BET surface area of 150 $m^2/g$ was obtained by following the procedure of Example 17, except that colloidal silica was used in place of zirconium oxychloride.

A catalyst was prepared by further following the procedure of Example 17, except that an aqueous manganese nitrate solution was used in place of the aqueous palladium chloride solution. Consequently, honeycombs of catalyst having a manganese dioxide content of 7% by weight, a bore diameter of 3 mm, a wall thickness of 0.58 mm, and a ratio of openings of 70% were obtained.

EXAMPLE 20

A catalyst of a composition of 7% by weight of $Co_3O_4$ and 93% by weight of Al was obtained by impregnating commercially available γ-alumina carrier beads 4 mm in diameter with an aqueous cobalt nitrate solution and drying and calcining the wet carrier beads.

EXAMPLE 21

A 1-liter sample of each of the catalysts of Examples 17 to 20 was packed in a reaction tube. Water containing 5 mg of ozone per liter and possessing a pH value indicated in Table 4 was fed at normal rood temperature at a flow volume of 50 liters/hour to induce a reaction. The treated water at the outlet of the reaction tube was tested for ozone content to determined the ratio of ozone decomposition by the treatment. The results of the treatment were as shown in Table 4.

COMPARATIVE EXPERIMENT 2

A reaction was carried out by following the procedure of Example 21, except that electrolytic manganese dioxide beads 5 mm in diameter were used instead. The result of the reaction was as shown in Table 4.

COMPARATIVE EXPERIMENT 3

Water containing 5 mg of ozone per liter and possessing a pH value of 5.1 was treated by following the procedure of Example 21, except that the reaction tube was not packed with any catalyst. The result was as shown in Table 4.

TABLE 4

| Catalyst | PH of treating liquid | Ratio of ozone decomposition (%) |
|---|---|---|
| Example 17 catalyst | 6.8 | 99 |
| Example 18 catalyst | 6.8 | 95 |
| Example 19 catalyst | 6.8 | 99 |
| Example 20 catalyst | 5.1 | 90 |
| Example 17 catalyst | 5.1 | 96 |
| Example 18 catalyst | 8.5 | 99 |
| Comparative experiment 2 catalyst | 6.8 | 27 |
| Comparative experiment 3 catalyst (no catalyst) | 5.1 | 1 |

EXAMPLES 22 TO 30

A 1-liter sample of a varying catalyst indicated in the following table was placed in a reaction tube. Water containing 5 mg of ozone per liter and possessing a pH value 6.8 was fed thereto at room temperature at a flow volume of 50 liters/hour to induce a reaction. The treated water at the outlet of the reaction tube was tested for ozone content to determine the ratio of decomposition of ozone by the treatment. The results of the treatment were as shown in Table 5.

TABLE 5

| Example | Catalyst | Catalyst composition | Rate of ozone decomposition (%) |
|---|---|---|---|
| Example 22 | Example 4 | Rh (1 wt %) - $Al_2O_3$ (75 wt %) | 99 |
| Example 23 | Example 5 | $Fe_2O_3$ (25 wt %) - TZ[80:20] (75 wt %) | 94 |
| Example 24 | Example 6 | CuO (10 wt %) - TZ[80:20] (90 wt %) | 96 |
| Example 25 | Example 7 | AgO (10 wt %) - TS[90:10] (90 wt %) | 96 |
| Example 26 | Example 8 | NiO (10 wt %) - $TiO_2$ (90 wt %) | 88 |
| Example 27 | Example 9 | Pt (0.2 wt %) - TZ[70:30] 99.8 wt %) | 99 |
| Example 28 | Example 10 | Ru (1 wt %) - TS[80:20] (99 wt %) | 98 |
| Example 29 | Example 11 | Ir (1 wt %) - $SiO_2$ (99 wt %) | 97 |
| Example 30 | Example 12 | Au (1 wt %) - $TiO_2$ (99 wt %) | 97 |

What is claimed is:

1. A method for treating water which comprises causing the water under treatment to contact a catalyst thereby deodorizing, sterilizing, and decoloring said water by the action of ozone or to decompose the remove ozone dissolved in said water, wherein said catalyst comprises a first catalyst component formed of the oxide of at least one metal selected from the group consisting of titanium, silicon, and zirconium and a second catalyst component formed of at least one metal selected from the group consisting of manganese, iron, cobalt, nickel, cerium, tungsten, copper, silver, gold, platinum, palladium, rhodium, ruthenium, and iridium or a sparingly water-soluble compound of said metal, wherein manganese, iron, cobalt, nickel, cerium, tungsten, copper, and silver are used in said second catalyst component only as oxide or sulfide, and gold, platinum, palladium, rhodium, ruthenium and iridium are used in said second catalyst component only as metal, said catalyst comprising in the range of 70 to 99.99% by weight of said first catalyst component and in the range of 30 to 0.01% by weight of said second catalyst component, provided that the sum of the two catalyst components is 100%, and wherein said treatment is carried out at 0° to 60° C.

2. A method according to claim 1, wherein said catalyst is produced in the form of pellets, pipes, or honeycombs and is used as a stationary catalyst bed.

3. A method according to claim 1, wherein the flow volume of said water under treatment per liter of catalyst is in the range of 1 to 1,000 liters/hr.

4. A method according to claim 1, wherein said water treatment decomposes between about 88%–99% of said dissolved ozone.

5. A method according to claim 4, wherein the concentration of said dissolved ozone is in the range of from the saturated concentration of dissolved ozone to 0.1 mg/liter.

* * * * *